Nov. 23, 1948.  C. A. SCOGLAND  2,454,719
METHOD OF MAKING CORED LAMINATED PLASTIC SHEETS
Filed Nov. 11, 1943  2 Sheets—Sheet 1

INVENTOR.
Charles A. Scogland
BY
Brown, Jackson, Boettcher & Dienner
ATTORNEYS.

Nov. 23, 1948.  C. A. SCOGLAND  2,454,719
METHOD OF MAKING CORED LAMINATED PLASTIC SHEETS
Filed Nov. 11, 1943  2 Sheets-Sheet 2

INVENTOR.
Charles A. Scogland
BY
Brown, Jackson, Boettcher & Dienner
ATTORNEYS.

Patented Nov. 23, 1948

2,454,719

UNITED STATES PATENT OFFICE 2,454,719

METHOD OF MAKING CORED LAMINATED PLASTIC SHEETS

Charles A. Scogland, South Bend, Ind., assignor to The Studebaker Corporation, South Bend, Ind., a corporation of Delaware Application November 11, 1943, Serial No. 509,838

12 Claims. (Cl. 154—110)

My present invention relates to a method of making a laminated structure and to the article produced thereby, and more particularly is concerned with a method of forming cored laminated structures of plastic impregnated sheet material.

The problem of forming cored laminated structures of plastic impregnated paper or other suitable sheet material has not yet been accomplished satisfactorily from the economic and production standpoints. Prior processes of which I am aware are unsatisfactory in that excessive time is required to carry out the necessary steps thereof. Of the several prior methods only one to my knowledge has even remotely approached the degree of satisfaction necessary to make it economic for mass production. In this process a plurality of cores are wrapped with resin impregnated sheets, and the cores are then placed between layers of plastic impregnated sheet material. The assembly or body thus formed is then heated and pressed to unite the wrappings of the cores to the plastic impregnated sheets. The cores are then removed leaving a cored laminated structure. It is immediately apparent that the production problem of building laminated structure by this process would not be economically feasible due to the time and effort required in the wrapping of each individual core.

It is an object of my invention to provide a method of forming a laminated structure utilizing a novel arrangement of cores and sheets economically feasible for mass production. More specifically, it is an object of my invention to arrange a plurality of rows of deformable cores with the cores in each row extending substantially parallel lengthwise with respect to each other, between layers of plastic impregnated sheet material, and then heat and compress the body thus formed. Still more specifically, I propose to arrange the rows of cores so that the cores in adjacent rows are disposed in staggered relation to form a cored laminated structure in which the cores after compression of the body are deformed into substantially trapezoidal cross-sectional configuration. A still further object of my invention is to provide a laminated structure comprising, an outer layer of plastic impregnated sheet material and a second layer of plastic impregnated sheet material, the latter being formed with channels of substantially trapezoidal cross-section configuration and in which the second layer is united to the first layer at the portions of the former which define an outer surface of the same.

Other objects and advantages of my invention will appear from the detail description.

Now in order to acquaint those skilled in the art with the manner of practicing my invention, I shall describe in conjunction with the drawings certain preferred embodiments of the same.

Figure 1:
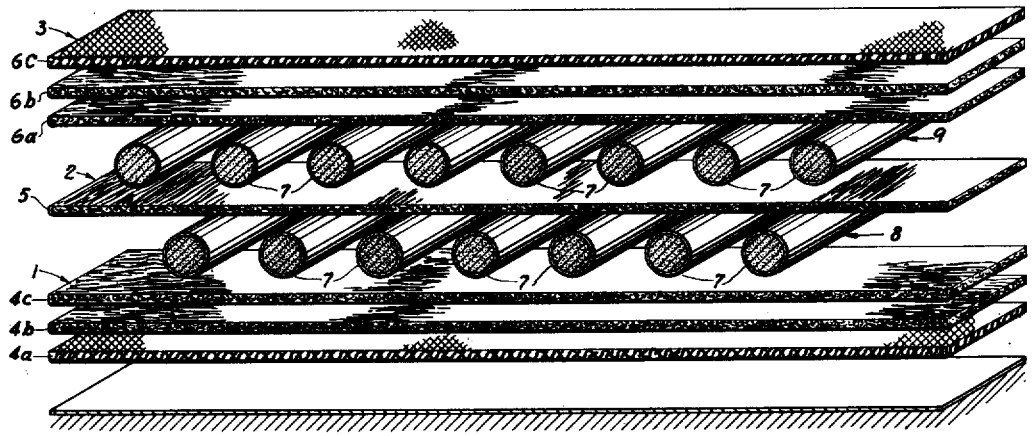
Figure 1 is a perspective view of an arrangement of a plurality of cores and layers of plastic impregnated sheets illustrating one manner in which my present invention may be practiced.

Referring now to Figure 1, I have shown a plurality of layers of plastic impregnated sheet material arranged to form a bottom layer 1, an intermediate layer 2, and a top layer 3. The bottom layer 1, as shown, comprises three sheets 4a, 4b and 4c of plastic impregnated paper. The intermediate layer 2, consists of a plastic impregnated crepe paper sheet 5. The top layer 3, comprises in the embodiment shown, three sheets 6a, 6b and 6c of plastic impregnated paper. A plurality of tubular deformable cores 7, are arranged to extend lengthwise in substantially parallel relation with respect to each other and in a first row 8 intermediate the paper sheet 4c of the bottom layer and the intermediate layer 2. A second row 9 is formed by a plurality of tubular deformable cores 7, which are arranged in parallel lengthwise relation with respect to each other. The row 9 is arranged intermediate the intermediate layer 2, and the bottom sheet 6a of the top layer 3. Each of the tubular cores 7 are of identical construction and each comprises a Cellophane tubing filled with sand. In my practicising of the process in accordance with Figure 1, Cellophane tubing for the cores was made from commercial Cellophane tubing manufactured by the Humitube Corporation of Peoria, Illinois. This Cellophane tubing is furnished in flat long spools ¾ inch wide and having a longitudinal seam. This Cellophane tubing was thermoplastic and therefore heat sealing. In production in making up the cores 7, flat Cellophane or other cellulose sheeting may be spooled through a tubular forming die. As the tubing is formed by the die the sand or other suitable core material is dropped into the tube from a hopper, and a longitudinal seam may be formed by a rotating heated wheel. Any desired length may be cut off from the tubing thus formed depending upon the length of laminated structure it is desired to produce. After selection of the appropriate length the ends of each tube may be sealed by any appropriate sealing means. Ordinary foundry core sand has been found to be satisfactory in making up the cores, although it will be understood that other suitable material may be used for this purpose.

For purposes of a specific disclosure of my invention in accordance with the embodiment of Figure 1, the sheet 4a may be a high tensile plastic paper and is used with the intent of giving a highly polished surface. A sheet suitable for this purpose is adequately served by using phenolic impregnated laminating sheet material identified as grade #55 and furnished on the open market by the Detroit Wax Company of Detroit, Michigan. The intermediate sheet 4b of the bottom layer 1, may be phenolic impregnated laminating material furnished by the above company and identified by it as grade #57. This sheet is a 17 mil kraft base sheet with 50% resin content. The uppermost sheet 4c of the lower layer 1, is phenolic impregnated laminating material, the product of the last named company and is identified by it as #16-C. It is of kraft paper and is creped. The first row of cores 8, is preferably laid at right angles to the crepe of the uppermost sheet 4c, of the bottom layer 1. The intermediate layer 5, may be of the same material as the sheet 4c. The sheet 5, is preferably placed with the crepe thereof running lengthwise in the same direction as the sand filled cores. The second row of cores 9, is assembled upon the upper surface of the intermediate sheet 5, and this second row 9 of cores is assembled to bring each core element thereof over the voids of the cores of the lowermost core assembly 8. In the practicing of my invention the several core elements 7, making up the two rows of cores 8 and 9 may be conveniently accomplished by placing of the core elements on strips of pressure sensitive scotch tape to form a ladder like assembly. In the present modification the cores are placed on the strips of tape one diameter distance from each other. It will be observed that the two rows of cores 8 and 9 are thus arranged in staggered relation with respect to each other. The upper layer 3, is formed of a lower sheet 6a of phenolic impregnated laminated material grade #16-C above identified with the crepe again running at right angles or transversely of the longitudinal axes of the core elements 7, of row 9. The intermediate layer 6b of the top layer 3, is of sheet material of the same character as the sheet 5b. The outer or upper sheet 6c of the upper layer 3, is of the same material as the sheet 4a.

The layers 1, 2 and 3 and the two rows of cores 8 and 9, are arranged in the manner described. Preferably building up of the body is begun upon a base member, which base may comprise a photographer's chrome plated ferrotype member. On the top of the assembly of sheets and cores above described a second member like the base member is placed. The entire assembly is then placed between the platens of a suitable press. The platens of the press are preferably provided with suitable thermostatically controlled heating means.

In actual practice of my invention in accordance with the embodiment of Figure 1, I maintained the platens at a temperature of 370° F. Pressure was gradually applied to the platens until it attained 300 pounds per square inch. The body was permitted to cure at this pressure and temperature for approximately ten minutes. The assembly was then removed from the press and the chrome polishing plates stripped off after which the opposite ends of the Cellophane tubing making up the core elements 7, were cut off and the sand removed therefrom with an air hose. In connection with this actual practicing of the method of my invention, the several sheets making up the layers and the two rows of cores, were of approximate dimension forming a structure measuring 6" x 6".

In the above modification, I have referred to specific forms of plastic impregnated paper for the purposes of describing a specific embodiment of my invention, but it will be understood that my invention is not limited thereto as there are many suitable types of phenolic impregnated laminated material, both in paper and fabric, which may be used without departing from my invention. Likewise, the particular form of plastic impregnating medium may be either thermo plastic or thermosetting compounds. The following thermosetting impregnating agents have been found to be satisfactory for paper or fabric:

A. *Thermosetting*

1. Phenol-formaldehyde sold under the trade names of Bakelite and Durez;
2. Urea-formaldehyde sold under the trade names of Bakelite, Beetle and Plaskon;
3. Melamine-formaldehyde sold under the trade names of Catalin, Melmac and Plaskon.

Also sheet material impregnated with the following thermoplastic impregnating agents were found satisfactory:

B. *Thermoplastic*

1. Vinyl-chloride acetate sold under the trade name of Vinylite;
2. Vinyl-chloride sold under the trade names of Koroseal and Vinylite;
3. Vinylidene chloride sold under the trade names of Saran and Velon;
4. Methyl methacrylate sold under the trade names of Crystalite, Lucite and Plexiglas;
5. Polystyrene sold under the trade names of Bakelite, Loalin, Lustron and Styron;
6. Ethyl cellulose sold under the trade names of Ethocel, and Hercules E. C.;
7. Cellulose acetate sold under the trade names of Bakelite, Herculois, Fiberstos, Plastacele and Tenite I;
8. Cellulose acetate butyrate sold under the trade name of Tenite I.

The above thermosetting and thermoplastic agents are merely illustrative since any impregnating agent may be used which is effective to bind portions of the adjacent surfaces of the several layers 1, 2 and 3 to each other. It may be found that the range of temperature and pressure conditions and time of curing will vary since these characteristics will depend upon the plastic impregnant. Also it would be feasible to construct the cores of an alloy that would permit curing temperatures to be applied and then to melt and run out the cores by the application of heat. This form of core would however only be satisfactory for use with a thermosetting type of resin. Also it will be understood that the layers may be impregnated with liquid resins suitable for effecting lamination by only contact pressure. Such resins are available today which in the monomeric stage and plastic compounds an example of which, is the liquid identified as CR-39 manufactured by the Columbia Chemical Division of the Pittsburgh Plate Glass Company. This latter is a compound derived from allyl alcohol. Further it will be understood that a flexible hose of rubber or other elastomer filled with gas or fluid under pressure could be used in making up the core elements for practicing my invention.

Figure 2:
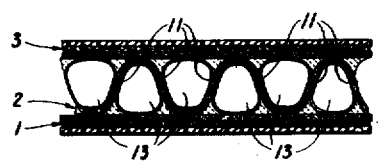
Figure 2 is a transverse sectional view of a portion of a laminated structure formed by the process of Figure 1.

The cored laminated structure shown in Figure 2, is formed by the process described above in connection with Figure 1. It will be seen that the intermediate layer 2, formed by the crepe paper sheet 5 has been stretched, and, as shown, this layer in the finished product forms strut elements 11, extending diagonally with respect to the top and bottom surfaces of the laminated structure. Application of pressure by means of a suitable press in the manner previously described causes deformation of the several tubular cores of rows 8 and 9 so that the core elements are caused to assume a form in which they are of substantially trapezoidal cross-sectional configuration which in turn provides for formation of the intermediate layer 2, into the supporting struts above described. It will be observed that each adjacent pair of strut portions 11 converge toward one surface of the structure and that they diverge with respect to the other surface of the structure. The article formed by the method described in connection with Figure 1, is thus formed with a plurality of lengthwise extending grooves 13, through which, if desired, air or liquid may be circulated for heating or cooling purposes.

Figure 4:
Figure 4 is a cross-sectional view of a portion of a laminated structure formed by the embodiment of the invention shown in Figure 3.
Figure 3:
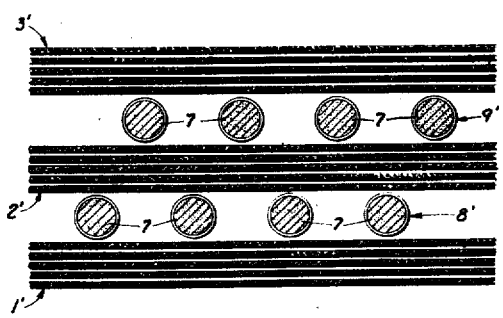
Figure 3 is a transverse sectional view of another arrangement of cores and sheets similar to that of Figure 1.

In the embodiment of Figures 3 and 4, a greater number of plastic impregnated paper sheets are used to make up the bottom and top layers 1' and 3' respectively. In the form of the invention herein shown the intermediate layer 2' comprises a plurality of intermediate plastic impregnated sheets to form a heavier strut 11' for the finished article. The two rows of cores 8' and 9', are arranged with respect to the layers 1', 2' and 3' as described in connection with Figure 1. The several sheets making up the layers 1', 2' and 3' may be impregnated with any suitable plastic medium such as those described above.

Figure 6:
Figure 6 is a transverse cross-sectional view of a laminated structure formed by the embodiment of Figure 5.
Figure 5:
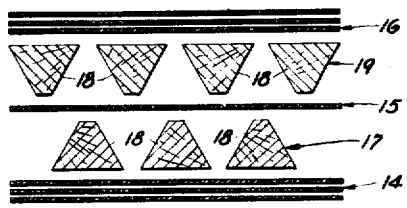
Figure 5 is a transverse sectional view of another form of my invention utilizing strips of wood as the core elements.

In the form of the invention shown in Figures 5 and 6 the several layers 14, 15 and 16 may be identical with layer 1, 2 and 3, respectively, of Figure 1. In this form of the invention a first row 17 of cores is formed by a plurality of strips of white pine wood 18. These strips are formed so that they are of substantially trapezoidal cross-section. A plurality of these strips is arranged in parallel lengthwise relation with respect to each other with the side edges of adjacent strips diverging toward the bottom layer 14 and between the latter and the intermediate layer 15. A second row 19 is also made up of a plurality of strips 18 arranged in parallel lengthwise relation with respect to each other and with the adjacent side edges of adjacent strips in diverging relation with respect of the upper layer 16. As before, the core elements 18, of rows 17 and 19 are arranged in staggered relation and are suitably spaced with respect to each other so that upon compression of the body, shown in Figure 5, by means of a suitable press the cores of the two rows 17 and 19 are caused to interfit. With the application of heat during this pressing step the laminated structure of Figure 6 is formed. It will be observed from Figure 6, that the adjacent side surfaces of adjacent cores of the two rows of cores 17 and 19 extend in the same direction and that the intermediate layer 15, extends between the adjacent side surfaces of adjacent core elements and along alternate top and bottom surfaces of the successive core elements. In this form of the invention the cores 18 are not removed. Since the cores 18 are made of a soft wood they may be slightly compressed when the assembly of Figure 5, is arranged in a suitable press. However the cores 18 after compression of the body retain their substantially trapezoidal cross-sectional configuration. The trapezoidal cross-sectional shape of the strips 15, has been found necessary to allow for the stretch or deformation of the resin impregnated crepe kraft paper used as the inner or intermediate bonding layer 15.

Figure 7:
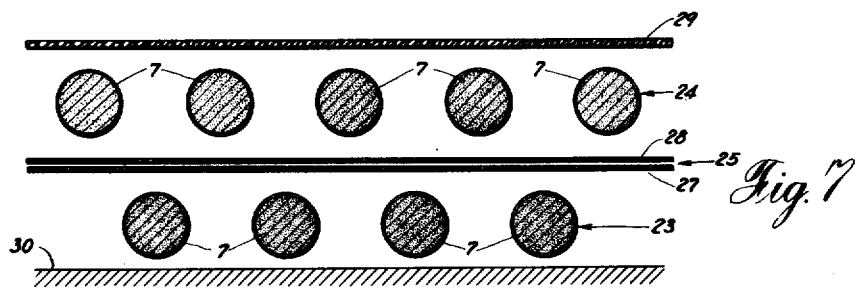
Figure 7 is a transverse cross-sectional view illustrating another embodiment of the method of my invention.
Figure 8:
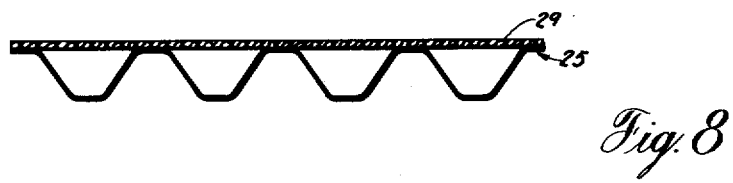
Figure 8 is a transverse cross-sectional view of a structure formed by the process of Figure 7.

In the form of the invention shown in Figure 7, two rows, 23 and 24 of sand cores 7 are arranged on either side of a layer 25, comprising two plastic impregnated creped sheets 27 and 28 arranged with the crepe thereof extending lengthwise of the core elements as before. A top layer 29, of plastic impregnated fabric material is disposed in juxtaposition to the several core elements making up the row 24, so that the row 24 lies between the layers 25 and 29. The lowermost row 23 of core elements rests upon a suitable supporting member 30 which may comprise the base platen member of a suitable press. Upon application of heat and pressure as aforesaid the cores making up the rows 23 and 24 will be deformed so that they become substantially trapezoidal in cross-section. In this manner the structural member of Figure 8 is formed. It will be understood that the several cores making up the two rows 23 and 24 are identical to the cores 7, previously described. The sheet material for the layers 25 and 29 may consist of paper or fabric impregnated with any suitable plastic agent. After the assembly of Figure 7, has been heated and pressed, the sand cores are removed, as described in connection with Figure 1, forming the structural member of Figure 8. In this figure it will be seen that the layer has been deformed so that it now comprises successive lengthwise extending channels of substantially trapezoidal cross-section opening alternately into the upper and lower surfaces thereof. It will be observed that a plastic bond is formed between the sheet 28, of the layer 25, and the layer 29 at the portions thereof defining the upper surface of layers 25 as viewed in Figure 8, and that the two sheets 27 and 28 are united to each other.

Figure 9:
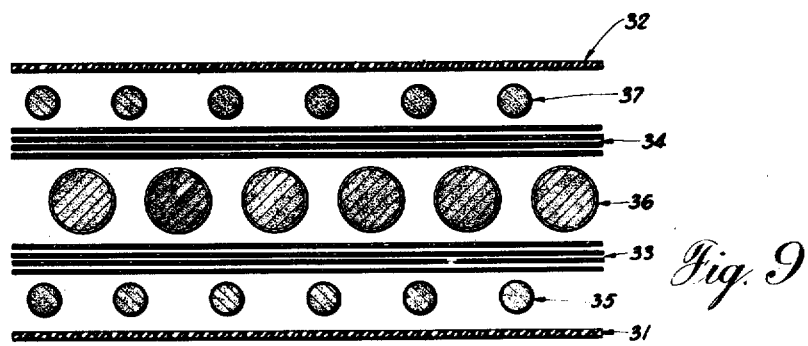
Figure 9 is a cross-sectional view of still another modification of the method of my invention.
Figure 10:
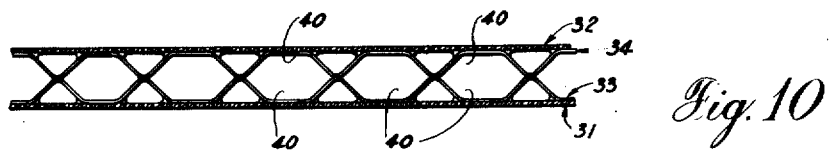
Figure 10 is a transverse cross-sectional view of a laminated structure formed by the arrangement of Figure 9.

Referring now to Figures 9 and 10, I have shown a pair of outer layers of plastic impregnated sheet material 3 and 3, and a pair of intermediate layers of plastic impregnated sheet material 33 and 34. The layers 33 and 34, each comprises a plurality of plastic impregnated creped paper sheets arranged preferably with the crepe extending lengthwise of three rows of cores 35, 36 and 37. It will be understood, however, that the sheets making up any of the layers intermediate two rows of cores of the present embodiment, or any of the other embodiments of my invention need not necessarily be of creped material, since fabric or the like having adequate stretching qualities to be deformed about the cores may be used without relying upon creped material for this purpose. The rows of cores 35 and 37 are made up of core elements like the cores 1 previously described, which rows are arranged, respectively, between the outer layer 31 and intermediate layer 33, and outer layer 32 and intermediate 34. The intermediate core row 36 is made up of a plurality of parallel arranged Cellophane sand filled cores of a diameter substantially twice that of the diameters of the cores of rows 35 and 37. The core elements of core rows 35 and 37 are arranged in overlying relation and in staggered relation with respect to the core elements of row 36. As before the body thus formed is arranged in a suitable press and heat applied, deforming the cores and bonding or uniting the adjacent portions of the several layers brought into contact with each other. It will be observed that the cores of rows 35 and 37 are spaced apart a distance substantially equal to the diameter of the core elements of row 36, and the core elements of row 36 are spaced a distance substantially equal to the diameter of the cores of rows 35 and 37. The resultant product of the method of Figure 9, is shown in Figure 10. In Figure 10, it will be observed that by the core arrangement described, the intermediate layers 33 and 34 are caused to have a plurality of substantially parallel and uniformly spaced channels 40 of substantially trapezoidal configuration in cross-section formed therein. By virtue of the core arrangement of this embodiment of the invention, the open ends of the channels formed in the intermediate layers 33 and 34 are disposed in opposed relation with the portions thereof defining their outer surface united by a plastic bond to the adjacent portions of the inner surfaces of the outer layers 31 and 32.

While I have shown and described my invention in connection with the formation of substantially flat structural members, it will be understood that my method is readily applicable in building up structural members of compound cores by a suitable mold in lieu of the flat platens of the press for compressing the built up assembly of cores and layers of plastic impregnated material above described.

It will be further understood that various rearrangements may be made in practicing my invention without departing from the spirit and scope thereof.

I claim:

1. The method of forming a laminated structure comprising, arranging rows of deformable cores in spaced parallel relation between layers of plastic impregnated sheet material with the cores of adjacent rows being arranged in staggered relation with respect to each other, and compressing the body thus formed to deform the cores providing the layer between them with a plurality of parallel channels of polygonal cross-sectional configuration, and heating said body to unite portions of adjacent layers between the deformed cores with each other.

2. The method of forming a laminated structure comprising, arranging in substantially parallel spaced rows a plurality of deformable cores of substantially circular cross-section in substantially uniformly spaced parallel relation with respect to each other in each row between alternate layers of plastic impregnated sheet material, the cores of each row being spaced apart a distance equal at least to the diameter of the cores and with the cores of adjacent rows in staggered relation with respect to each other, and compressing the body thus formed to deform said cores and provide the layer between them with a plurality of channels of polygonal cross-sectional configuration.

3. The method of forming a cored laminated structure comprising, arranging in substantially parallel spaced rows a plurality of deformable tubular cores of substantially circular cross-section in substantially uniformly spaced parallel relation with respect to each other in each row between alternate layers of plastic impregnated sheet material, the cores of each row being spaced apart a distance equal at least to the diameter of the cores and with the cores of adjacent rows disposed in staggered relation with respect to each other, compressing and heating the body thus formed to deform said cores to provide the layer between them with a plurality of parallel channels of substantially trapezoidal cross-section and unite the portions of said last named layer between the deformed cores with the adjacent layers, and removing the cores.

4. The method of forming a laminated structure comprising, arranging a plurality of deformable first core elements of substantially circular cross-section to extend substantially parallel lengthwise with respect to each other, positioning a first plastic impregnated sheet with one of its surfaces in juxtaposition of said first core elements, arranging a plurality of deformable second core elements of substantially circular cross-section to extend substantially parallel lengthwise with respect to each other and in the same direction as said first core elements, said second core elements being disposed adjacent the other surface of said first sheet, positioning a second plastic impregnated sheet so that said second core elements are disposed between said first and second sheets, and compressing the body thus formed to deform said cores and cause them to become substantially trapezoidal in cross-section.

5. The method of forming a laminated structure comprising, positioning a first plastic impregnated sheet with one of its surfaces in juxtaposition of a plurality of deformable first core elements of substantially circular cross-section extending substantially parallel lengthwise with respect to each other, positioning a second plastic impregnated sheet so that said first core elements are disposed between said first and second sheets, arranging a plurality of deformable second core elements of substantially circular cross-section to extend substantially parallel lengthwise with respect to each other and adjacent the side of said second sheet opposite said first core elements, positioning a third plastic impregnated sheet so that said second core elements are disposed between said second and third sheets, and compressing and heating the body thus formed to deform said cores to cause them to become substantially trapezoidal in cross-section whereby said second sheet is formed with a plurality of parallel channels of substantially trapezoidal cross-sectional configuration with the portion of said second sheet between the cores being united to the other sheets.

6. The method of forming a laminated structure comprising, arranging a first plastic impregnated layer of sheet material with one exterior surface thereof in juxtaposition of a plurality of deformable first core elements of substantially circular cross-section extending substantially parallel lengthwise with respect to each other, positioning a second layer of plastic impregnated sheet material so that said first core elements are disposed between said first and second layers, arranging a plurality of second deformable core elements of substantially circular cross-section extending lengthwise in the same direction as said first core elements and adjacent the surface of said second layer opposite the surface thereof disposed adjacent said first core elements, positioning a third layer plastic impregnated sheet material so that said second core elements are disposed intermediate said second and third layers, arranging a plurality of deformable third core elements of substantially circular cross-section extending lengthwise in the same direction as said first and second core elements, said third core elements being adjacent the exterior surface of said third layer opposite the surface thereof disposed adjacent said second core elements, positioning a fourth plastic impregnated layer of sheet material so that said third core elements are disposed between said third and fourth layers, said first and third cores being disposed in overlying relation with respect to each other and with said second cores being disposed intermediate thereof, and heating and compressing the body thus formed to deform said cores to cause them to become polygonal in cross-section.

7. The method of claim 6 wherein the cross-sectional area of each of the second cores is substantially twice that of the cross-sectional area of each of the first and third cores, and said first and third cores being arranged to extend lengthwise in the same direction and being spaced apart a distance equal substantially to the diameter of the second core elements.

8. The method of forming a laminated structure comprising arranging a plurality of deformable sand core elements of substantially circular cross-section to extend substantially parallel lengthwise with respect to each other, positioning a first layer of plastic impregnated sheet material with one exterior surface of said layer in juxtaposition of said first cores, arranging a plurality of deformable second sand core elements of substantially circular cross-section to extend substantially parallel lengthwise with respect to each other and in the same direction as said first core elements, said second sand core elements being disposed adjacent the outer surface of said first layer, positioning a second layer of plastic impregnated sheet material so that said second core elements are disposed between said first and second layers, and compressing and heating the body thus formed to deform said cores to cause them to become substantially trapezoidal in cross-section.

9. The method of forming a laminated structure comprising arranging on each side of a first layer of plastic impregnated material, a row of cores deformable by pressure into polygonal cross-section configuration with the cores in each row being disposed in spaced parallel relation with respect to each other, and with the cores in adjacent spaced rows being in staggered relation with respect to each other, arranging a second layer of plastic impregnated material with one of its surfaces in juxtaposition to one row of said cores, and compressing the body thus formed to deform the cores and provide said first layer with parallel channels of polygonal cross-sectional configuration and unite portions of said first layer between said cores and in juxtaposition of the second layer thereto.

10. The method of claim 9, in which the first layer is of material creped in one direction, and in which the crepe extends parallel with the cores.

11. The method of claim 9, in which the first layer of material is creped in one direction, and in which the crepe extends parallel with the cores, and in which the second layer of material is creped in one direction with the crepe thereof extending transversely of the cores.

12. The method of claim 9 in which the cores comprise tubular flexible members filled with granular material whereby said cores are deformable by pressure.

CHARLES A. SCOGLAND.

REFERENCES CITED

The following references are of record in the file of this patent:

UNITED STATES PATENTS

| Number | Name | Date |
|---|---|---|
| 1,343,191 | Allcutt | June 15, 1920 |
| 1,469,220 | Kemp | Oct. 2, 1923 |
| 2,231,529 | Dey | Feb. 11, 1941 |
| 2,300,760 | Amigo | Nov. 3, 1942 |
| 2,347,566 | Komenda | Apr. 25, 1944 |

FOREIGN PATENTS

| Number | Country | Date |
|---|---|---|
| 545,090 | Great Britain | May 11, 1942 |